US006862661B2

United States Patent
Riedle et al.

(10) Patent No.: US 6,862,661 B2
(45) Date of Patent: Mar. 1, 2005

(54) OBJECT ORIENTED APPROACH TO A REDUNDANT ARRAY STORAGE SYSTEM

(75) Inventors: Linda Ann Riedle, Apex, NC (US); Dean Alan Kalman, Cary, NC (US); Richard Christopher Fore, Apex, NC (US); Albert Andre Asselin, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 09/892,377

(22) Filed: Jun. 26, 2001

(65) Prior Publication Data

US 2002/0199059 A1 Dec. 26, 2002

(51) Int. Cl.[7] .............................................. G06F 12/08
(52) U.S. Cl. ..................................... 711/114; 711/117
(58) Field of Search ................................ 711/114, 117

(56) References Cited

U.S. PATENT DOCUMENTS

| 5,537,588 A | | 7/1996 | Engelmann et al. ........ 395/600 |
|---|---|---|---|
| 5,542,064 A | * | 7/1996 | Tanaka et al. .............. 711/114 |
| 5,559,764 A | | 9/1996 | Chen et al. .................... 369/30 |
| 5,568,629 A | | 10/1996 | Gentry et al. ................ 395/441 |
| 5,708,769 A | | 1/1998 | Stallmo .................. 395/182.04 |
| 5,761,526 A | * | 6/1998 | Sakakura et al. .............. 710/1 |
| 5,974,503 A | | 10/1999 | Venkatesh et al. .......... 711/114 |
| 6,154,854 A | | 11/2000 | Stallmo .......................... 714/6 |

OTHER PUBLICATIONS

Microsoft Computer Dictionarym Copyright 1999, Microsoft Press, Fourth Edition, p. 372.*
The Authoritative Dictionary of IEEE Standards Terms, Copyright 2000, IEEE Press, 7th Edition, p. 1065.*

* cited by examiner

*Primary Examiner*—Mano Padmanabhan
*Assistant Examiner*—Midys Ihoa
(74) *Attorney, Agent, or Firm*—Sawyer Law Group LLP; Jeanine S. Ray-Yarletts

(57) ABSTRACT

A method and system for managing data in a data storage system including a plurality of physical storage devices is disclosed. The method and system comprises providing a plurality of modules, where each of the plurality of modules includes at least one child. Each module receives an input command related to the data from a source, where the source is transparent to the module. The module decides to which one of its children to pass the input command, and passes the input command to that child for processing the data accordingly.

27 Claims, 9 Drawing Sheets

|  | D1 180 | D2 182 | D3 184 | P1 186 |
|---|---|---|---|---|
| Sector 0 | S0 | S0 | S0 | S0 |
|  | S1 | S1 | S1 | S1 |
|  | S2 | S2 | S2 | S2 |
|  | S3 | S3 | S3 | S3 |
|  | S4 | S4 | S4 | S4 |
|  | S5 | S5 | S5 | S5 |
|  | S6 | S6 | S6 | S6 |
|  | S7 | S7 | S7 | S7 |
|  | S8 | S8 | S8 | S8 |
|  | S9 | S9 | S9 | S9 |
|  | S10 | S10 | S10 | S10 |
|  | S11 | S11 | S11 | S11 |
|  | S12 | S12 | S12 | S12 |
|  | S13 | S13 | S13 | S13 |
|  | S14 | S14 | S14 | S14 |
| Sector 15 | S15 | S15 | S15 | S15 |

FIG. 5

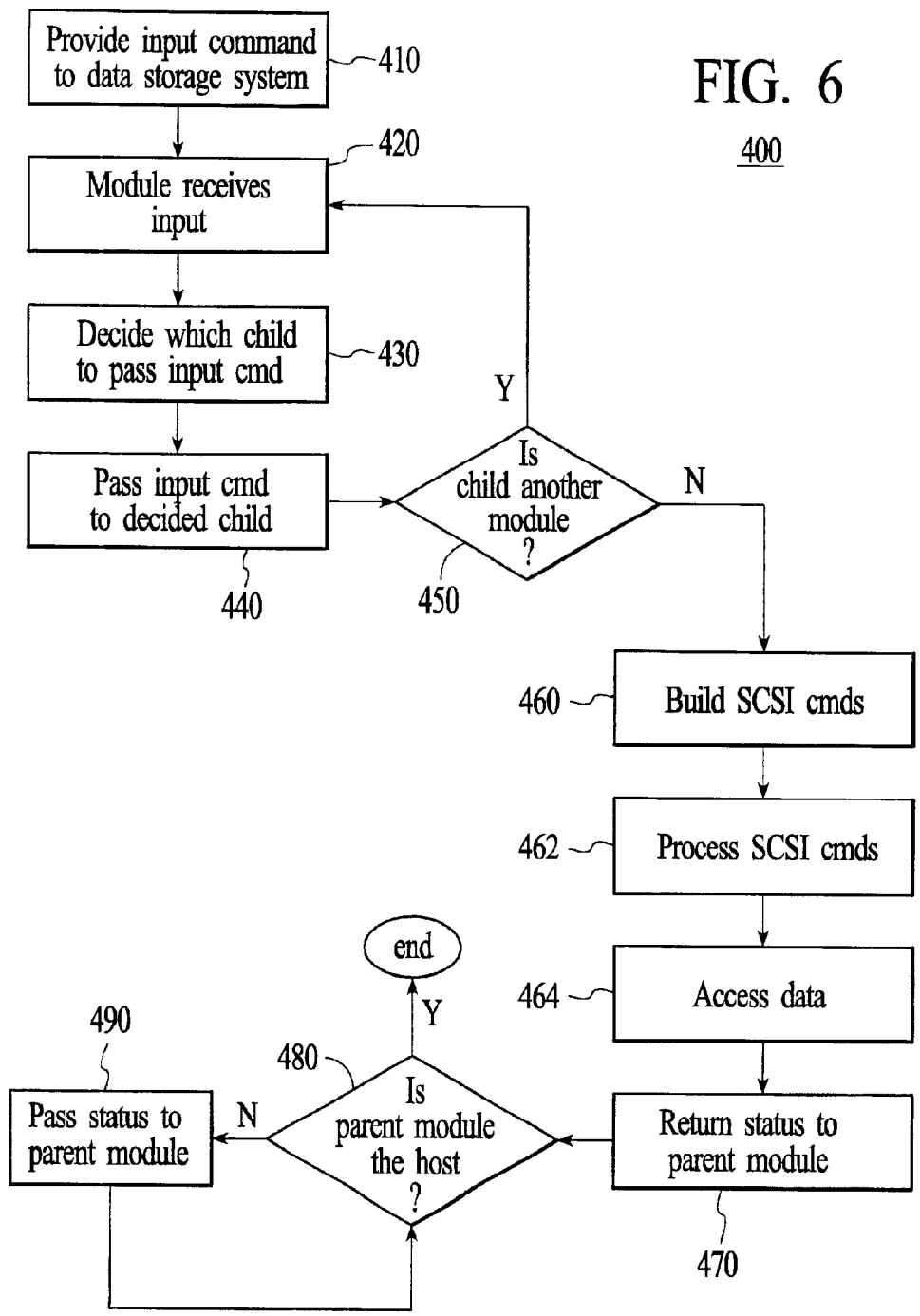

OBJECT ORIENTED APPROACH TO A REDUNDANT ARRAY STORAGE SYSTEM

FIELD OF THE INVENTION

The present invention relates in general to improved data storage systems and in particular to an object oriented approach to a redundant array storage system.

BACKGROUND OF THE INVENTION

As the performance of microprocessors and the level of semiconductor memory technology increases, there is a need for improved data storage systems with comparable performance enhancements. Additionally, as the performance of data storage systems improves, there is a corresponding need for improved reliability of data stored.

In 1988, in a paper entitled "A Case for Redundant Arrays of Inexpensive Disks (RAID)," a research group at the University of California at Berkeley presented a storage system utilizing a redundant array of storage disk drives that would not only improve performance (e.g., faster data transfer and data I/O), but would also provide higher reliability at a lower cost. RAID improves performance by disk striping, which interleaves bytes or groups of bytes across the array of disks, so more than one disk can be reading and writing simultaneously. Fault tolerance is achieved by mirroring or parity. Mirroring is the complete duplication of the data on two drives. Parity data is generated by taking the contents of all storage units subject to failure and "Exclusive OR'ing" (XOR'ing) them. The resulting parity data is stored with the original data, and may be used to recover lost data due to a disk failure.

A host, such as a computer system, typically views a RAID as a single disk although RAID includes an array of disks. A RAID controller may be a hardware and/or software tool for providing an interface between the host and the array of disks. The RAID controller manages the array of disks for storage and retrieval and can view the disks of the RAID separately. The manner in which the controller manages the disks is defined by a particular "RAID level." The RAID level defines how the data is distributed across the disk drives and how error correction is accomplished. For instance, RAID level 0 provides disk striping only, which improves performance, but provides no reliability or fault tolerance. RAID level 5 (RAID 5), on the other hand, is characterized by striping data across three or more drives and generating parity data which is distributed across all disks. Thus, RAID 5 offers high performance as well as high reliability.

As stated above, RAID storage systems improve performance by striping data over all of the data disks in the array. The portion of a stripe of data in one disk is known as a "stripe unit." Thus, the size of a "stripe unit" will be the size of the stripe divided by the number of disks in the array. The "stripe unit" is further broken down into a plurality of "sectors," where all sectors are an equivalent predefined size.

Disk arrays are preferably configured to include logical drives that divide the physical drives into logical components, which may be viewed by the host as separate drives. In other words, from the perspective of the host, the logical drive is a single storage unit, while in reality, the logical drive represents an array of physical drives. The logical drive is divided into a plurality of storage blocks, each block being identified by a logical address. When the host issues commands, e.g. READ or WRITE, to its logical drive, the commands will designate the logical address of the data, and not the physical drive.

Each logical drive includes a cross section of each of the physical drives. So, for example, FIG. 4 shows one logical drive 160 spanning across four physical drives 152, 154, 156, 158 of a RAID 5 array. The host assigned to that logical drive 160 will have access to data stored in stripes 164, 166, 168 in the logical drive 160. In addition, each logical drive is assigned a RAID level. Thus, as is seen in FIG. 4, the data in each stripe 164, 166, 168 in the logical drive 160 of the RAID 5 array is interleaved across the cross sections of three of the four physical drives and parity data is stored in the cross section of the fourth drive.

The discussion above generally describes a single-tier, or non-hierarchical, RAID system. FIG. 1A is a schematic diagram illustrating a non-hierarchical RAID 0 system 10. In such a system, the logical drive is hard coded to assume that the physical drives 30 are the lowest component making up the RAID 0 array 20, and that the highest level is the host operating system 11. A hierarchical RAID system would conceptually comprise of multiple tiers of different RAID levels. For example, in FIG. 1B, a RAID 50 logical drive 10' would comprise of a RAID 0 array 20' of m RAID 5 arrays 40. The two-level relationship of hierarchical RAID is hard-coded to assume the top level is the host 11', which leads to the RAID 0 array 20', which in turn breaks into m sub-RAID levels 40, which in turn, each break into n physical drives 30'.

A hierarchical approach to a RAID array is advantageous because the storage system can be expanded to a large number of physical storage devices, such as disk drives, while maintaining a high performance level. For instance, as shown in FIG. 2A, in a non-hierarchical RAID 5 array having 45 drives, data for a stripe is distributed across 44 drives, and the remaining drive receives the parity data for the stripe. Data from other stripes are similarly distributed, except that the drive receiving the parity data rotates, such that all parity data is not contained on a single drive. Thus, the stripe data and the parity data are distributed across all drives. If one drive fails, the system must read data from the other 44 drives in order to rebuild the degraded drive. Thus, as the number of drives increases, the ability to rebuild a failed drive efficiently deteriorates.

In FIG. 2B, a hierarchical RAID 50 array is illustrated. Here, the RAID 5 array having 45 drives of FIG. 2A can be represented as a hierarchical RAID 50 array comprising a RAID 0 array 50 of 3 RAID 5 arrays (60a, 60b, 60c), each having a set of 15 drives (70a, 70b, 70c). The same 45 drives are available, but now, rebuilding a failed drive, for example drive 2 in set 70a, entails reading only from the other 14 drives in the set 70a, as opposed to all 44 drives. Thus, performance is improved.

While a hierarchical approach to RAID arrays is desirable, implementation of such a system is tedious and time consuming. For example, as stated above, to implement a RAID 50 array, the developer is required to hard-code every operation, where the input is presumably from a host and the output is presumably sent directly to a disk. The code would change for every hierarchical configuration. Thus, the hardcode for a hierarchical RAID 50 array would be different from code of a RAID 51 array. If the hierarchy went beyond two levels, the code would become much more complicated and development costs would be prohibitive. Testing and debugging would also be cumbersome.

Accordingly, a need exists for a more efficient and less complex way for implementing a hierarchical RAID system with minimal or no additional development efforts, i.e. no new code. The present invention addresses such a need.

SUMMARY OF THE INVENTION

An object oriented method and system for managing data in a data storage system including a plurality of physical storage devices is disclosed. The method and system comprises providing a plurality of modules, where each of the plurality of modules includes at least one child. Each module receives an input command related to the data from a source, where the source is transparent to the module. The module decides to which one of its children to pass the input command, and passes the input command to that child for processing the data accordingly.

Through the aspects of the present invention, each RAID level is an object that is encapsulated, that is, the RAID module receives inputs, but does not assume they are from the host or any other source, and produces outputs, but does not assume they are going to a drive. By isolating the RAID level from its predecessor and from its successor, any hierarchical RAID configuration and any number of hierarchical tiers can be built by combining the encapsulated RAID modules. Minimal or no additional programming is required. As an added feature, background functions, such as rebuilding a degraded disk drive, can be represented by a programming module, which can then be used to simplify coding.

BRIEF DESCRIPTION OF THE DRAWINGS

FIG. 5 depicts a pictorial image of a single stripe of a RAID disk storage system in accordance with an embodiment of the present invention.

FIG. 6 illustrates a high level logic flowchart according to the method of the present invention.

DETAILED DESCRIPTION

The present invention relates in general to improved data storage systems and in particular to an object oriented approach to a redundant array storage system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 3:
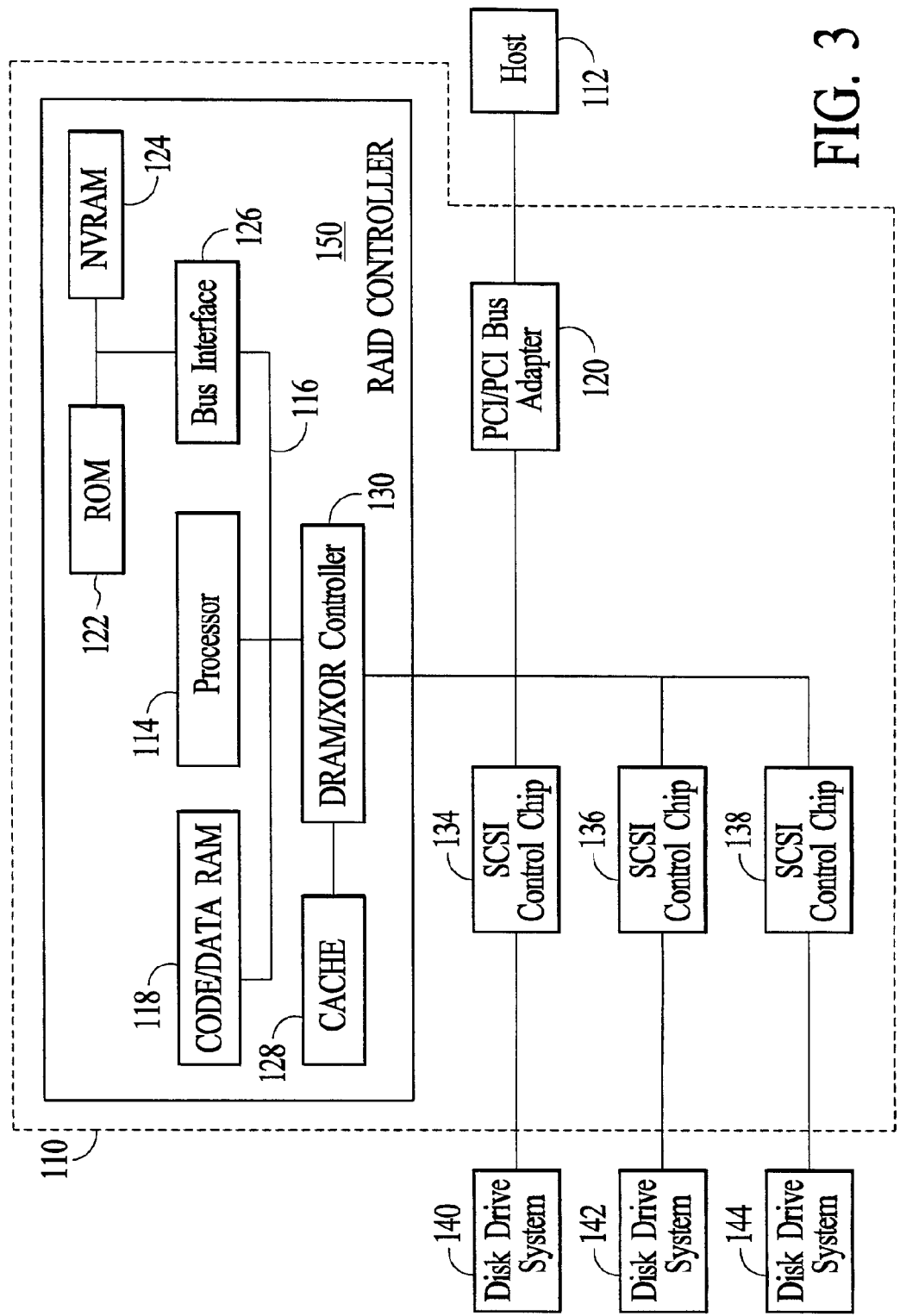
FIG. 3 is a high level block diagram of a RAID data storage system in accordance with a preferred embodiment of the present invention.

FIG. 3 illustrates a high level block diagram of a RAID data storage system 110. As depicted, the RAID data storage system 110 is coupled to host processor 112 via PCI/PCI bus adapter 120. The data storage system 110 and host processor 112 may be incorporated in a single data processing system hardware unit, e.g. a computer or workstation, or two separate units. The host processor 112 and data storage system 110 can be a stand-alone system or part of a network such as a local area network (LAN) or the like.

As illustrated, the data storage system 110 includes a RAID controller 150, which provides an interface between the host 112 and the multiple disk drive data storage systems 140, 142, 144 comprising a plurality of disks (not shown). The RAID controller 150 includes a processor 114 coupled to processor bus 116. Also coupled to processor bus 116 is code/data RAM 118 which is utilized to store temporarily code and data utilized by the processor 114. ROM 122 and non-volatile random access memory (NVRAM) 124 are typically accessed via bus interface 126, which is coupled to processor bus 116. ROM 122 typically stores operational code, which is "fetched" by processor 114 upon initialization of operation to direct the processor 114 to perform functions relating to the management of the data in the disk drive storage systems.

The RAID controller 150 also includes a cache 128, which is coupled to DRAM/XOR controller 130. Cache 128 may be configured into a plurality of temporary storage positions for data. DRAM/XOR controller 130 is used to control access to random access memory and also provides a hard implemented exclusive OR (XOR) circuit which may be used to calculate parity for change in updated data.

DRAM/XOR controller 130 is coupled to a plurality of small computer system interface (SCSI) control chips 134, 136 and 138. The SCSI control chips 134, 136, 138 support a disk drive storage system comprising a plurality of disks. Those having ordinary skill in this art will appreciate that alternative bus architectures may be utilized to implement the data storage system, however, the depicted embodiment of the present invention utilizes multiple disk drive data storage systems 140, 142, 144 which are configured in the SCSI bus architecture.

Referring again to FIG. 4, a pictorial image of a RAID 5 disk drive system is shown. Four physical drives 152, 154, 156, and 158 are depicted. A logical drive 160 is distinguished as a cross section of the four physical drives 152, 154, 156 and 158. The remainder 162 of the physical drives 152, 154, 156, 158 may contain a plurality of stripes and/or other logical drives. As is shown, the logical drive 160 contains three stripes 164, 166, 168. The portion of the cross section of each physical drive is a stripe unit.

Figure 4:
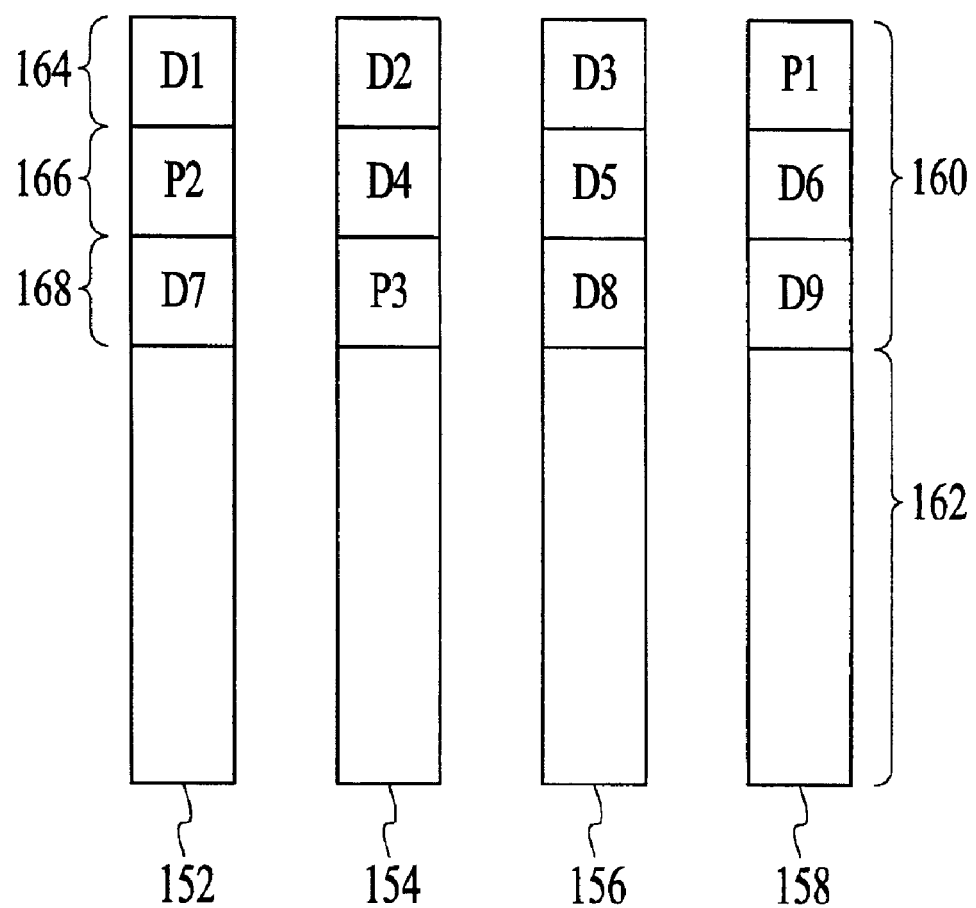
FIG. 4 illustrates a pictorial image of a RAID disk storage system in accordance with a preferred embodiment of the present invention.

FIG. 5 illustrates a pictorial image of the single stripe 164 depicted in FIG. 4. In this example, each cross section of the first 180 (D1), second 182 (D2), third 184 (D3) and fourth 186 (D4) physical drives includes sixteen (16) sectors S0–S15. The size of each sector is equivalent and is typically 512 bytes. Typically, the size of the stripe unit, which is designated by the user, determines the number of sectors in each stripe unit.

As stated above, the RAID controller 150 manages the array of disks for storage and retrieval by defining a particular RAID level. For instance, suppose the RAID controller 150 defines the hierarchical RAID 50 array illustrated in FIG. 2B (three RAID 5 arrays with 15 disk drives). In order to implement this system, a developer would provide specific code describing 45 disk drives divided into three RAID 5 arrays (60a, 60b, 60c) of 15 drives each. Each RAID 5 array (60a, 60b, 60c) would be hard coded to receive commands from the host and to manage data on its 15 disk drives (70a, 70b, 70c).

Figure 1A:
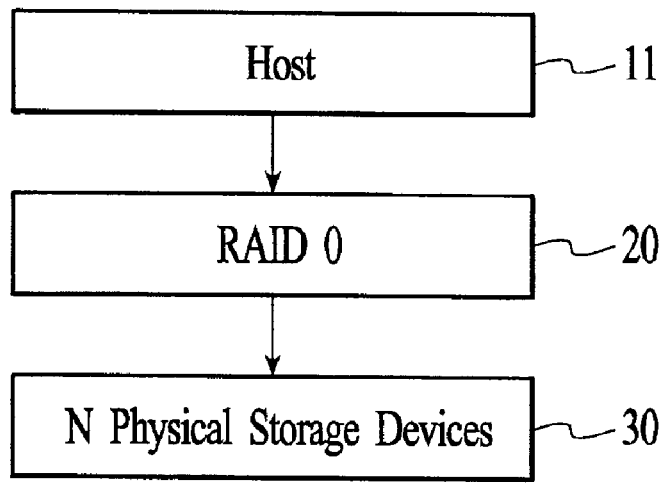
FIG. 1A illustrates a schematic of a non-hierarchical RAID 0 array.
Figure 1B:
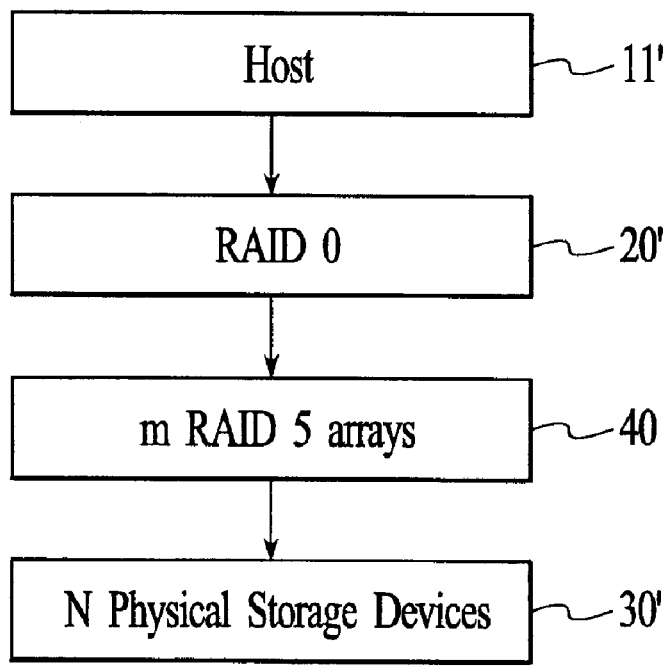
FIG. 1B illustrates a schematic of a hierarchical RAID 50 array.
Figure 2A:
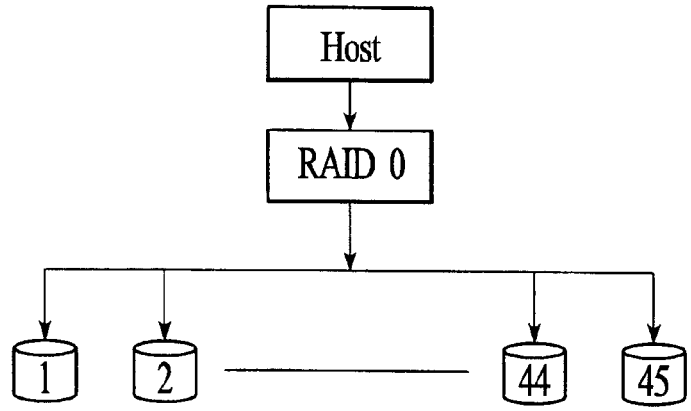
FIG. 2A illustrates a schematic of a non-hierarchical RAID 5 array with 45 drives.
Figure 2B:
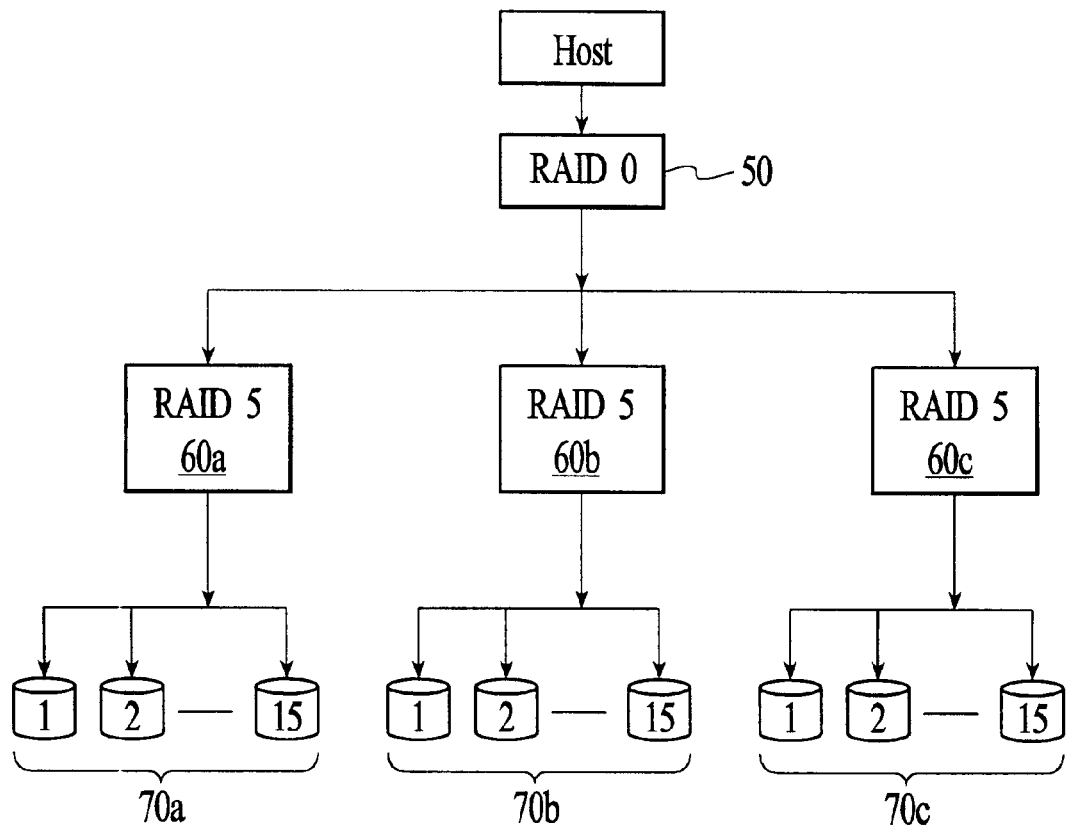
FIG. 2B illustrates a schematic of a hierarchical RAID 50 array having 45 drives.

So, for example, suppose the RAID 50 system illustrated in FIG. 2B receives the following input from the host:

EXAMPLE 1

WRITE to Logical Address 20

The RAID controller 150 would be hardcoded such that logical address 20 is equivalent to sector 4 (S3) on disk drive 1 in the second RAID 5 array 60b. The code would further provide instructions as to where the parity information should be written (e.g., disk drive 10 in the second RAID 5 array), and instructions to the SCSI controller chip to build the appropriate SCSI commands which would be processed and executed by the disk drive.

As RAID configurations become more complicated, the code describing the entire system becomes more lengthy and unmanageable. Thus, what seems conceptually simple, e.g., a hierarchical RAID array, is a logistic nightmare.

According to a preferred embodiment of the present invention, non-hierarchical and hierarchical RAID configurations are viewed as a combination of RAID modules. Each particular RAID module is encapsulated, i.e., inputs and outputs are not fixed to any particular device. Thus, any hierarchical RAID configuration and any number of hierarchical tiers can be built by combining the encapsulated RAID modules.

Each module represents a particular RAID level, in other words, each module contains programming code representing the features of a particular RAID level. Each encapsulated module is adapted to receive an input command, which is related to the data stored in the physical storage devices. Unlike the conventional system, however, the module is not coded to assume that the source of the input is the host. Thus, in the preferred embodiment of the present invention, the source of the input command is transparent to the module.

In addition, each encapsulated module includes at least one output path, or child. The module is not coded to assume that its children are disk drives. Thus, the destination of each child is transparent to the module. Because each module is encapsulated, programming modules can be mixed and matched to form hierarchical RAID configurations with little or no programming effort. As a result, the code is simpler and easier to test and debug.

To illustrate the present invention, refer again to the hierarchical RAID 50 array illustrated in FIG. 2B. According to the preferred embodiment of the present invention, the RAID 50 array comprises a RAID 0 module 50 combined with three parallel RAID 5 modules (60a, 60b, 60c). Applying the command in Example 1 above, the RAID 0 module 50 receives the "WRITE to sector 20" command. The RAID 0 module 50 receives the command without assuming it comes from the host. The RAID 0 logic knows it has three children and that each child is divided into a number of units which comprise a fixed number of address blocks, e.g., sixteen, but the RAID 0 logic does not assume the children are disk drives. Indeed, the children are actually three RAID 5 arrays (60a, 60b, 60c), which are transparent to the RAID 0 module 50. The RAID 0 module 50 breaks up the input command in a RAID 0 fashion and determines that logical address 20 is located in its second child at address block 4. The RAID 0 module then passes the command "WRITE to Address Block 4" to its second child. Once the command is passed onto the second child, the RAID 0 module 50 waits for a response from its second child or for another input.

In this example, the second child is a RAID 5 module 60b having 15 children. The RAID 5 module 60b receives the "WRITE to Address Block 4" command without assuming it comes from the RAID 0 module 50, the host, or from any other source. It knows it has 15 children 70b and that each child is divided into a number of units which comprise a fixed number of address blocks, e.g., sixteen, but does not assume that its children are disk drives, when in fact they are. The RAID 5 module 60b breaks up the input command in a RAID 5 fashion and determines Address Block 4 is located in its first child at the first child's address block 4, and that parity should be written to its tenth child. The RAID 5 module then passes the "WRITE to address block 4" command to its first child and instructs that parity data should be passed to its tenth child. Once the instructions have been passed to the second and tenth children, the RAID 5 module 60b waits to hear from its children about the status of the tasks.

In any system, the input command will eventually reach a disk drive, and in this example, the first child of the RAID 5 module 60b is disk drive 16 and the tenth child of the RAID 5 module 60b is disk drive 25. Here, the disk drives "know" they are disk drives, so when the first child of RAID 5 module 60b (i.e., drive 16) receives the "WRITE to address block 4" command, it knows that "address block 4" is sector 4. The drive will then build, process and execute the appropriate SCSI commands which will satisfy the input command. When each command has been completed, each disk drive will inform its parent module (i.e., RAID 5 module 60b), which will in turn inform its parent module (RAID 0 module 50), and so on, until the last module, i.e., the host, is informed.

FIG. 6 is a high level flowchart illustrating a method 400 for managing data in a data storage system in accordance with a preferred embodiment of the present invention. As is shown, the process begins by providing an input command in step 410. The input command is a typical data management command, such as READ or WRITE, and originates from a host computer 12 (FIG. 3). The input command is received by a module in step 420. In step 430, the module decides, based on the input command, which of its children to call in order to pass the input command onto the next tier. Once a child is determined in step 430, the input command is passed to the child in step 440.

At this point, the module has completed its function and awaits the next input command or a response from its child(ren) indicating that the command has been satisfied. If the latter is received, the module passes this information up to its parent. In this embodiment, the source of the input command is completely transparent to the module. In addition, the module is only aware that it has children. The module has no idea of the nature of its children, in other words, its children may be other modules or they may be disk drives. So, if the child in step 440 is in fact another module, steps 420 to 440 will be repeated for the other module.

If the child is not a module, it must be a physical storage device. Thus, once the physical storage device child receives the input command, in step 460, it builds SCSI commands. The SCSI commands are processed in step 462, and the data accessed in step 464. Finally, the status of the input command is returned up through the hierarchical tree (i.e., from child to parent) to the host computer via steps 470–490. Although the process illustrated in FIG. 6 shows returning the status of the command (step 470) after data access (step 464), one of ordinary skill in the art would readily appreciate that status information could be returned at any level of the hierarchy. For instance, each module could pass a message to its parent each time it passed a command to its child. Such variations would be within the scope of this invention.

By utilizing encapsulated programming modules, various RAID configurations, hierarchical and nonhierarchical, can be easily implemented. Moreover, because the modules are isolated, background functions, such as rebuilding a degraded disk drive, flashcopy, and logical drive migration, are easily supported by inserting a "spanned partition" between modules. The spanned partition is itself a module that includes programming instructions to perform a particular background function, and can be inserted between a parent module and its child module. Like other modules, the spanned partition has children and can receive an input from an anonymous source.

For example, if one of the disk drives in the array fails, the system can rebuild the disk drive from the remaining drives in the array. In this state, the RAID array is degraded, i.e. one of the drives has failed. A REBUILD background function can be performed by a rebuild spanned partition module, which is inserted above the degraded RAID array.

Figure 7A:
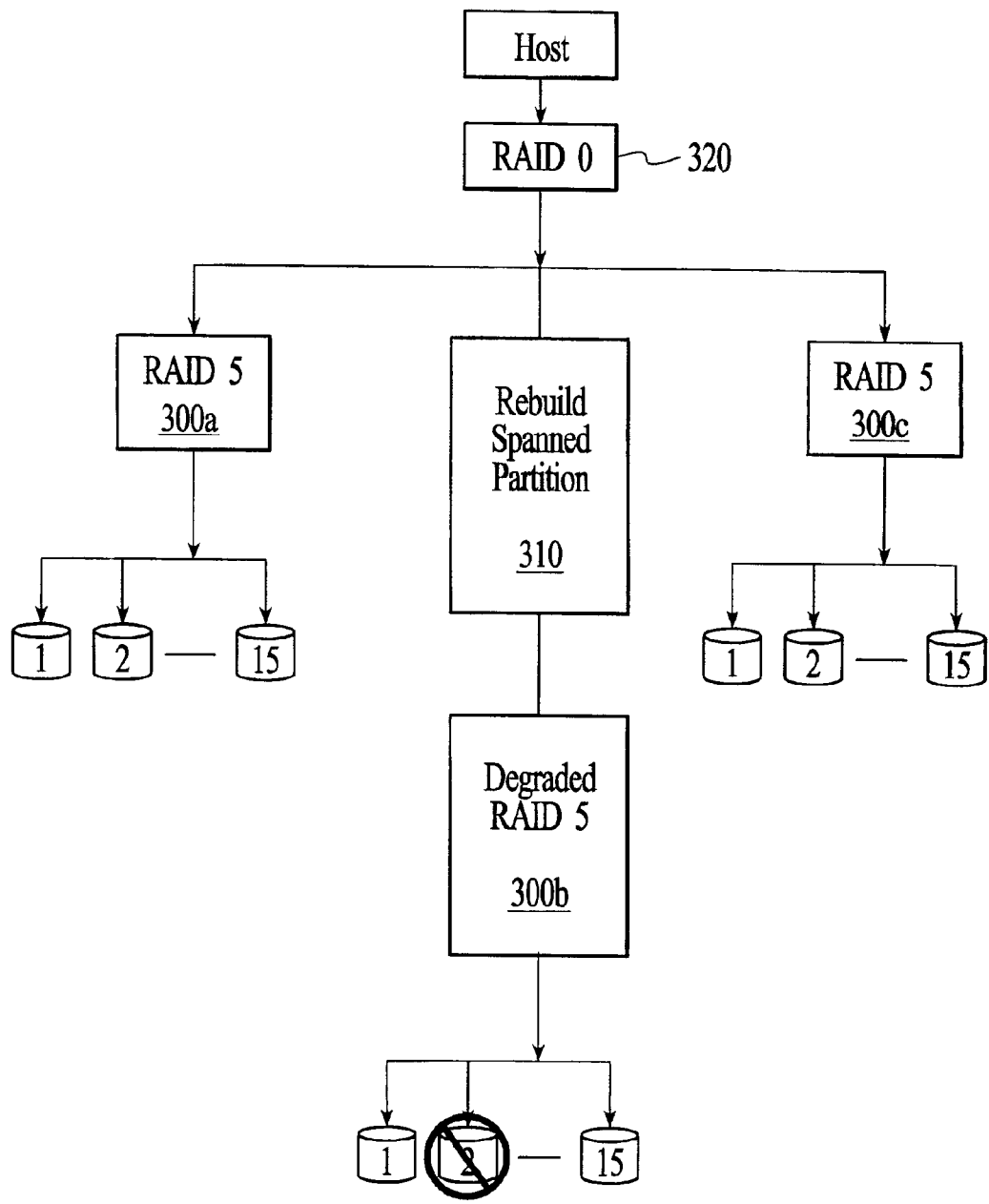
FIGS. 7A and 7B illustrate schematics of a rebuild spanned partition inserted in a hierarchical RAID 50 array having a degraded drive.

FIG. 7A illustrates how the schematic hierarchical RAID 50 array changes with the inclusion of the rebuild spanned partition in accordance with a preferred embodiment of the present invention. As is shown, the rebuild spanned partition 310 is inserted above the degraded RAID 5 array 300*b* which has a degraded disk drive (drive 2) as one of its children. In this embodiment, the rebuild spanned partition 310 is now the second child of the RAID 0 array 320, and the degraded RAID 5 array 300*b* is a child of the rebuild spanned partition 310. The rebuild spanned partition 310 directs the rebuilding of the degraded drive, while the RAID 0 array 320 and other RAID 5 arrays 300*a*, 300*b* function normally, blind to the rebuild process taking place.

Figure 7B:
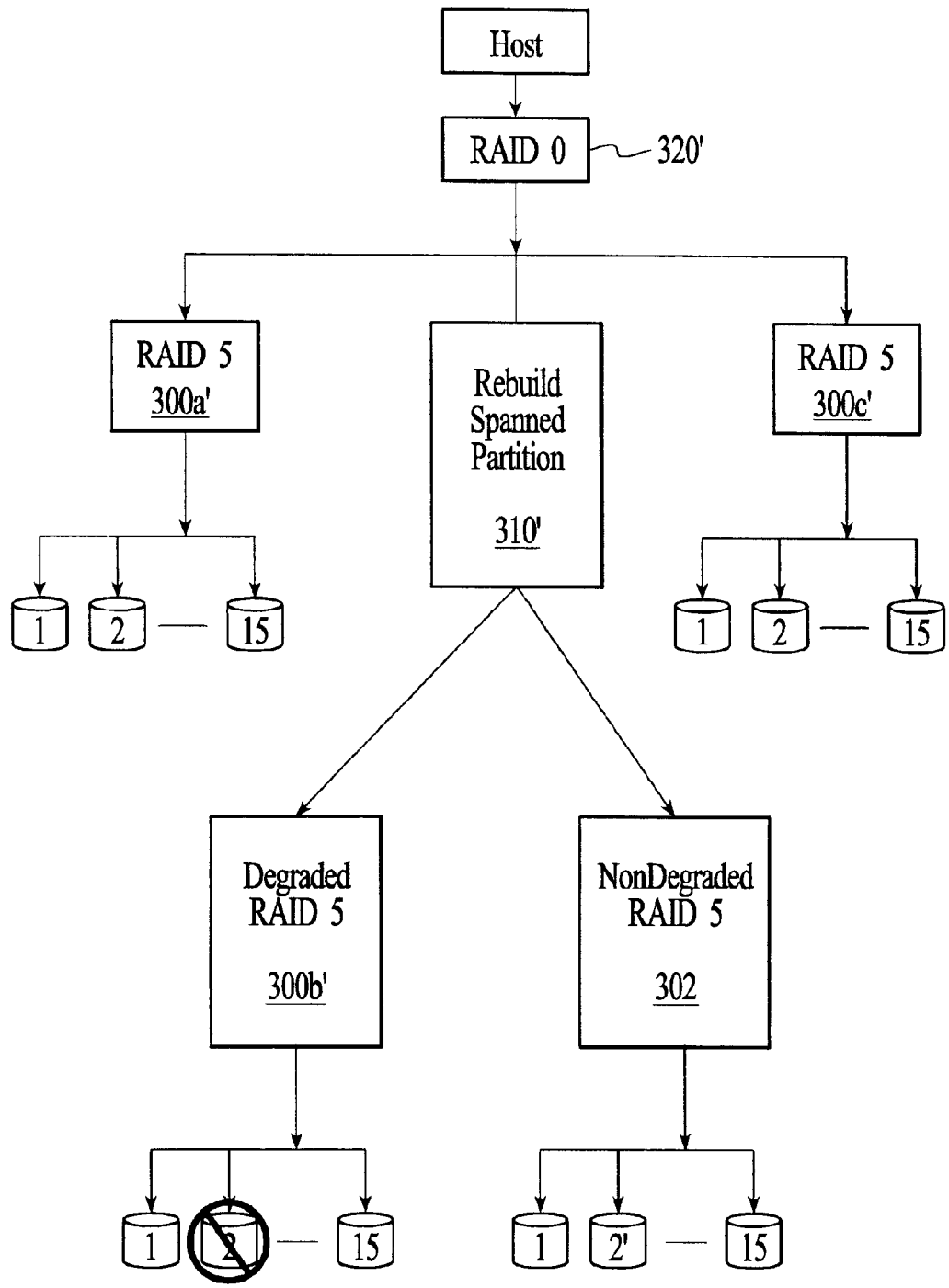
Figure 8:
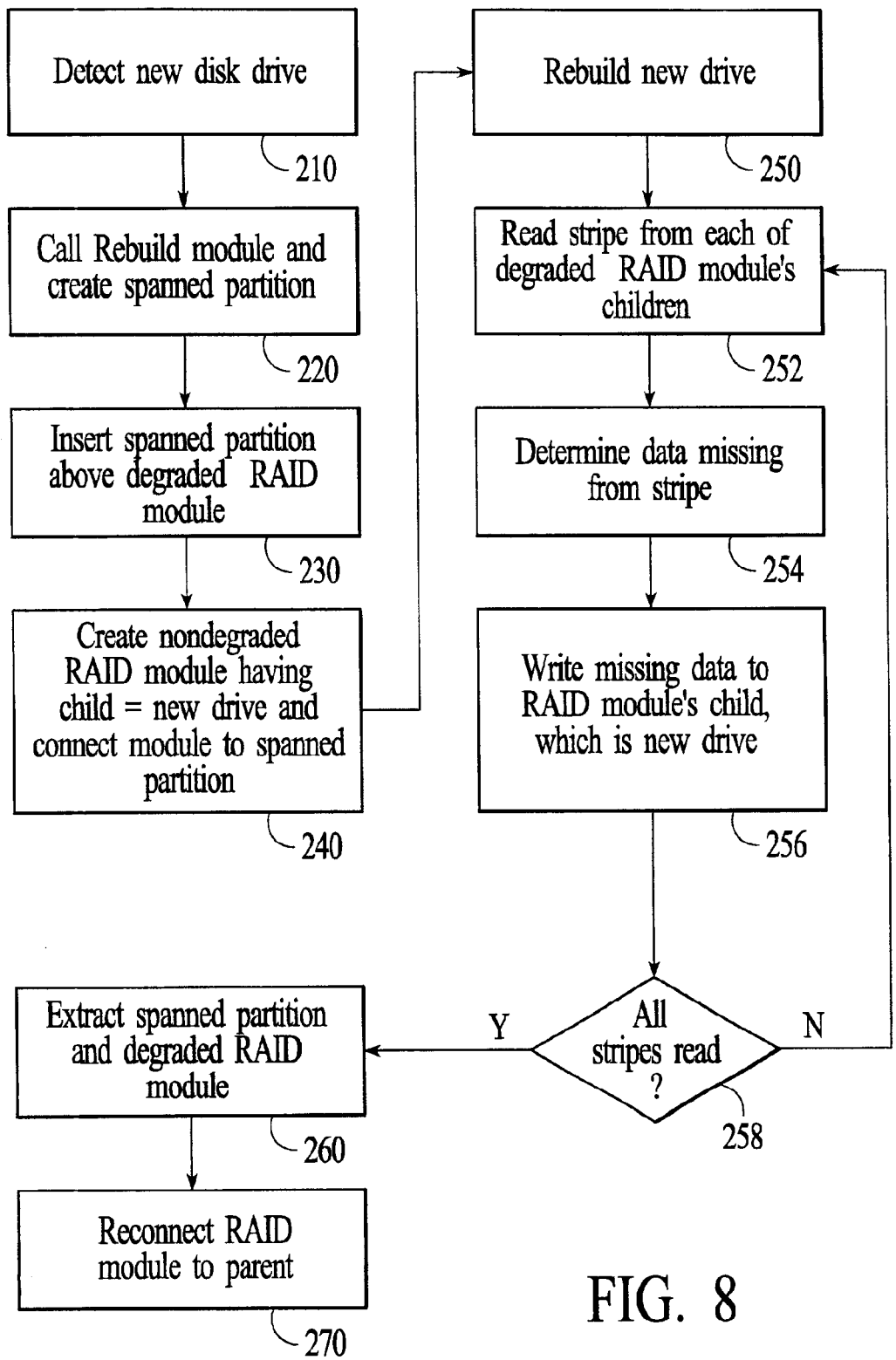
FIG. 8 is a high level logic flowchart according to the method of the present invention for rebuilding a degraded drive.

FIG. 8 is a high level flowchart illustrating a method 200 in accordance with a preferred embodiment of the present invention for rebuilding the degraded disk drive in the RAID array using the rebuild spanned partition 310. The process starts at step 210 when the system detects that a disk drive has been replaced with a new disk drive because, for example, the disk drive failed. A rebuild spanned partition 310 is called in step 220, and in step 230, inserted above the degraded RAID module 300*b* having the degraded drive as one of its children (FIG. 7A). Thus, the rebuild spanned partition 310 replaces the degraded RAID module 300*b* as a child to the preceding module, and the degraded RAID module 300*b* becomes a child of the spanned partition 310. In step 240, a nondegraded RAID module 302 is created, which is identical to the degraded RAID module 300*b*', except that it has the new drive 2' as one of its children. The nondegraded RAID module 302 is connected to the rebuild spanned partition 310' as its second child, as is shown in FIG. 7B.

In steps 250–258, the spanned partition 310' rebuilds the new drive 2' connected to the nondegraded RAID module 302 stripe unit by stripe unit. In step 252, the rebuild spanned partition 310' sends a READ command to the degraded RAID module 300*b*' to read a stripe of data from the degraded RAID module's children. Because one of the drives is degraded, the information returned from the children does not include the stripe unit from the degraded drive. In step 254, the data contained in the missing stripe unit is determined, for example, by XOR'ing the stripe units from the stripe. The rebuild spanned partition 310' then sends a WRITE command to the nondegraded RAID module 302 in step 256 to write the missing stripe unit to the child, which is the new drive 2'. In step 258, the spanned partition 310' determines whether all the stripes have been read. If not, another READ command is issued to the degraded RAID module 300*b*' and steps 252 to 256 are repeated for the next stripe.

When the rebuild is complete, i.e., all stripes have been read and missing stripe units written to the new disk 2', the spanned partition 310' extracts itself and the degraded RAID module 300*b*' in step 260. In step 270, the nondegraded RAID module 302 is reconnected to the parent module 320'.

The programming code to rebuild the degraded drive (drive 2) is completely contained in the rebuild spanned partition 310. Thus, the programming code for the RAID modules 320, 300*a*, 300*b*, 302, 300*c* remains isolated from the programming code for the background function. The RAID modules continue to receive input commands from a source (which for RAID modules 300*b* and 302 happen to be the spanned partition 310), and the RAID modules continue to speak to their children. Accordingly, introducing new functionality only requires coding the new function in a spanned partition and determining where and when to insert the spanned partition. The hierarchical framework remains largely unchanged. Thus, development efforts, such as coding and debugging, are made easier.

By taking an objected oriented approach according to aspects of the present invention, hierarchical and nonhierarchical RAID configurations are easily implemented without requiring new programming code for each configuration. Because particular RAID modules are encapsulated, i.e., inputs and outputs are not fixed to any particular device, any hierarchical RAID configuration and any number of hierarchical tiers can be built by combining the encapsulated RAID modules. Minimal or no additional programming is necessary. As an added feature, background functions, such as rebuilding a degraded disk drive, can also be encapsulated in a programming module, which can then be used to simplify coding, testing and debugging.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing data in a data storage system, the data storage system including a plurality of physical storage devices, the method comprising the steps of:
   a) providing a plurality of encapsulated modules, wherein each module comprises programming code for implementing features of a storage system utilizing Redundant Array of Inexpensive Disks (RAID) configuration and each module comprises at least one child;
   b) receiving an input command related to the data by one of the plurality of modules from a source, wherein the source is transparent to the one module;
   c) deciding which child of the at least one children to pass the input command; and
   d) passing the input command to the decided child for processing the data according to the input command.

2. The method of claim 1, wherein the source comprises another module.

3. The method of claim 1, wherein the one module is the child of another module.

4. The method of claim 1, wherein the source is a client computer.

5. The method of claim 1 further comprising the step of:
   e) determining whether the decided child, is another module of the plurality of modules; and
   f) repeating steps b)–d) if the decided child is determined to be another module.

6. The method of claim 5 further comprising the step of:
   g) if the decided child is determined in step e) to be a physical storage device, accessing the data stored in the physical storage device according to the input command.

7. The method of claim 6, wherein the accessing step g) further comprises:
   g1) building commands in the physical storage device to process the input command; and
   g2) executing the commands in the physical storage device.

8. The method of claim 7, wherein the physical storage device is a disk drive.

9. The method of claim 8, wherein the built commands are small computer system interface (SCSI) commands.

10. The method of claim 7, further including the step of:
    h) returning a status message from the decided child module to the parent module; and
    i) repeating step h) until the parent module is an operating system of a host.

11. A computer readable medium containing programming instructions for managing data in a data storage system, the data storage system including a plurality of disk drives, the programming instructions for:
    a) providing a plurality of encapsulate modules, wherein each module comprises programming code for implementing features of a storage system utilizing a Redundant Array of Inexpensive Disks (RAID) configuration and each module comprises at least one child;
    b) one of the plurality of modules receiving an input command from a source, wherein the source is transparent to the one module;
    c) deciding which child of the at least one children to pass the input command; and
    d) passing the input command to the decided child for processing.

12. The computer readable medium of claim 11, wherein the source comprises another module.

13. The computer readable medium of claim 11, wherein the one module is the child of another module.

14. The computer readable medium of claim 11, wherein the source is a client computer.

15. The computer readable medium of claim 11, further comprising the instructions for:
    e) determining whether the decided child is another module of the plurality of modules; and
    f) repeating steps b)–d) if the decided child is determined to be another module.

16. The computer readable medium of claim 15 further comprising the instruction for:
    g) if the decided child is determined in step e) to be a disk drive, accessing the data stored in the disk drive according to the input command.

17. The computer readable medium of claim 16, wherein the accessing instruction g) further comprising:
    g1) building commands in the disk drive to process the input command; and
    g2) executing the commands in the disk drive.

18. The computer readable medium of claim 17, wherein the built commands are small computer system interface (SCSI) commands.

19. The computer readable medium of claim 17, further including the instructions for:
    h) returning a status message from the decided child module to the parent module; and
    i) repeating step h) until the parent module is an operating system of a host.

20. A system for managing data in a data storage system, the data storage system including a plurality of physical storage devices, the system comprising:
    a host computer for allowing a user to enter an input command related to data in the data storage system; and
    a controller having an input coupled to the host computer and an output coupled to the plurality of physical storage devices, the controller further comprising:
        a plurality of encapsulate modules, wherein each module comprises programming code for implementing features of a storage system utilizing a Redundant Array of Inexpensive Disks (RAID) configuration and each module comprises at least one child;
        means for one of the plurality of modules receiving the input command from a source, wherein the source is transparent to the one module;
        means for deciding which child of the at least one children of the one module to pass the input command; and
        means for passing the input command to the decided child for processing the data in accord with the input command.

21. The system of claim 20, wherein the source is another module.

22. The system of claim 20, wherein the one module is the child of another module.

23. The system of claim 20, wherein the source is the host computer.

24. The system of claim 20, wherein the decided child is one physical storage device of the plurality of physical storage devices.

25. The system of claim 24, further comprising means for accessing the data stored in the one physical storage device.

26. The system of claim 25, wherein the means for accessing the data includes a plurality of control chips coupled to the controller, each control chip coupled to a corresponding physical storage device of the plurality of physical storage devices, wherein each control chip includes means for building commands to access the data in the corresponding physical storage device in accordance with the input command.

27. The system of claim 26, wherein the commands are small computer system interface (SCSI) commands.

* * * * *